(12) United States Patent
Tomar et al.

(10) Patent No.: US 12,475,432 B2
(45) Date of Patent: Nov. 18, 2025

(54) SYSTEMS AND METHODS FOR OPTIMIZING SPACE UTILIZATION OF CONTAINERS AT RETAIL STORAGE FACILITIES

(71) Applicant: Walmart Apollo, LLC, Bentonville, AR (US)

(72) Inventors: Vivek Tomar, Cincinnati, OH (US); Rei Siew Hew Sam, New York, NY (US); Sunada Chakravarthy, Metuchen, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/101,780

(22) Filed: Jan. 26, 2023

(65) Prior Publication Data

US 2023/0245059 A1    Aug. 3, 2023

Related U.S. Application Data

(60) Provisional application No. 63/304,950, filed on Jan. 31, 2022.

(51) Int. Cl.
*G06Q 10/087* (2023.01)
*G06Q 10/04* (2023.01)
(Continued)

(52) U.S. Cl.
CPC ........... *G06Q 10/087* (2013.01); *G06Q 10/04* (2013.01)

(58) Field of Classification Search
CPC .. G06Q 10/087; G06Q 10/04; G06Q 10/0631; B65G 47/52
(Continued)

(56) References Cited

U.S. PATENT DOCUMENTS 6,688,459 B1   2/2004  Bonham
8,086,344 B1  12/2011  Mishra
(Continued)

FOREIGN PATENT DOCUMENTS

WO   2001027567   9/2001
WO   2020185081   9/2020
(Continued)

OTHER PUBLICATIONS

PCT; PCT/US23/11600; Internationl Search Report and Written Opinion mailed May 15, 2023.
(Continued)

*Primary Examiner* — Luna Champagne
(74) *Attorney, Agent, or Firm* — Fitch, Even, Tabin & Flannery LLP

(57) ABSTRACT

Automated storage and retrieval systems for managing storage of inventory at a retail facility include a storage structure with storage locations configured to store containers that contain retail products, and a container transport system that transports the containers between the storage locations and a decanting station. A processor-based control circuit identifies a group of eligible containers for topping off (i.e., adding additional products) and determines a utilization value for each of the eligible containers. The control circuit determines an effort value for each of the eligible containers and ranks the eligible containers based on the utilization value and the effort value for each container. The control circuit then selects a subgroup from the eligible containers based on the rankings and causes the container transport system to transport each container in the subgroup of eligible containers from its respective storage location in the storage structure to the decanting station.

16 Claims, 7 Drawing Sheets

(51) Int. Cl.
  *B65G 47/52* (2006.01)
  *G06Q 10/0631* (2023.01)
(58) Field of Classification Search
  USPC .......................................................... 705/28
  See application file for complete search history.

(56) References Cited

U.S. PATENT DOCUMENTS

| | | | |
|---|---|---|---|
| 8,234,006 B1 * | 7/2012 | Sachar | G06Q 10/087 |
| | | | 700/214 |
| 9,230,233 B1 | 1/2016 | Sundaresan | |
| 9,460,524 B1 * | 10/2016 | Curlander | G01F 23/292 |
| 10,138,062 B2 | 11/2018 | High | |
| 10,246,275 B1 | 4/2019 | Lehmann | |
| 10,339,491 B2 | 7/2019 | Wakim | |
| 10,769,579 B1 | 9/2020 | Smith | |
| 11,001,438 B2 | 5/2021 | Eisenman | |
| 11,003,804 B2 | 5/2021 | Krishnamurthy | |
| 11,049,086 B2 | 6/2021 | Brooks | |
| 11,074,547 B2 | 7/2021 | Rajkhowa | |
| 11,142,402 B2 | 10/2021 | Lert, Jr. | |
| 11,948,120 B2 | 4/2024 | Tomar | |
| 11,954,641 B2 | 4/2024 | Tomar | |
| 12,013,686 B1 * | 6/2024 | Parness | B25J 9/1615 |
| 12,288,188 B2 | 4/2025 | Tomar | |
| 12,293,322 B2 | 5/2025 | Tomar | |
| 2013/0218799 A1 | 8/2013 | Lehmann | |
| 2015/0161317 A1 | 6/2015 | Moffitt | |
| 2017/0043953 A1 | 2/2017 | Battles | |
| 2018/0178992 A1 * | 6/2018 | Gondoh | B65G 1/0485 |
| 2018/0194556 A1 | 7/2018 | Lert, Jr. | |
| 2018/0247257 A1 | 8/2018 | Lert, Jr. | |
| 2018/0374046 A1 | 12/2018 | Powers | |
| 2019/0233213 A1 | 8/2019 | Phan-Quiroga | |
| 2019/0276176 A1 | 9/2019 | Almogy | |
| 2019/0322454 A1 | 10/2019 | Wan | |
| 2019/0378232 A1 | 12/2019 | Goren | |
| 2019/0389659 A1 | 12/2019 | Grinnell | |
| 2020/0039668 A1 | 2/2020 | Que | |
| 2020/0039746 A1 | 2/2020 | Lert, Jr. | |
| 2020/0087010 A1 | 3/2020 | Almogy | |
| 2020/0167727 A1 | 5/2020 | Ikeda | |
| 2020/0283245 A1 | 9/2020 | Gualtieri | |
| 2020/0306973 A1 | 10/2020 | Edwards | |
| 2020/0379440 A1 | 12/2020 | Ziegler | |
| 2020/0380746 A1 | 12/2020 | Natesan | |
| 2021/0103886 A1 | 4/2021 | Sezaki | |
| 2021/0149382 A1 | 5/2021 | Stadie | |
| 2021/0158272 A1 * | 5/2021 | Barr | G06Q 10/087 |
| 2021/0221619 A1 | 7/2021 | Lert, Jr. | |
| 2021/0241209 A1 | 8/2021 | Kim | |
| 2021/0256460 A1 | 8/2021 | Young | |
| 2022/0106121 A1 | 4/2022 | Puite | |
| 2022/0134543 A1 | 5/2022 | Amend, Jr. | |
| 2022/0135351 A1 | 5/2022 | Hickman | |
| 2022/0164765 A1 | 5/2022 | Masche-Pakkala | |
| 2023/0124552 A1 | 4/2023 | Sarkar | |
| 2023/0245034 A1 | 8/2023 | Tomar | |
| 2023/0281556 A1 | 9/2023 | Sunada | |
| 2023/0281557 A1 | 9/2023 | Vivek | |
| 2024/0193529 A1 | 6/2024 | Tomar | |
| 2024/0211878 A1 | 6/2024 | Tomar | |

FOREIGN PATENT DOCUMENTS

| | | | | |
|---|---|---|---|---|
| WO | WO-2021239559 A1 * | 12/2021 | ............... | B65G 1/04 |
| WO | WO-2021243059 A1 * | 12/2021 | ........... | G06Q 10/087 |
| WO | 2023146940 | 8/2023 | | |
| WO | 2023146942 | 8/2023 | | |
| WO | 2023146950 | 8/2023 | | |
| WO | 2023146953 | 8/2023 | | |

OTHER PUBLICATIONS

PCT; PCT/US23/11603; Internationl Search Report and Written Opinion mailed May 16, 2023.
PCT; PCT/US23/11588; International Search Report and Written Opinion mailed Apr. 17, 2023; 12 pages.
PCT; PCT/US23/11590; International Search Report and Written Opinion mailed Apr. 14, 2023; 13 pages.
U.S. Appl. No. 18/101,493, filed Jan. 25, 2023, Vivek Tomar.
U.S. Appl. No. 18/101,771, filed Jan. 26, 2023, Sunada Chakravarthy.
U.S. Appl. No. 18/101,791, filed Jan. 26, 2023, Vivek Tomar.
Geeksforgeeks; "Bin Packing Problem (Minimize number of used Bins)"; <https://www.geeksforgeeks.org/bin-packing-problem-minimize-number-of-used-bins/>; Jul. 28, 2021; pp. 1-17.
Van Aken, Margo; "An efficient bin-packing algorithm for packing groceries in a fulfillment center"; <https://repository.tudelft.nl/islandora/object/uuid%3Af4ee26b5-b94e-4cd3-9c7a-c281b0c8d8a8>; Mar. 8, 2019; 85 pages.
U.S. Appl. No. 18/101,493; Non-Final Rejection mailed Sep. 7, 2023; (pp. 1-17).
U.S. Appl. No. 18/101,493; Notice of Allowance and Fees Due (PTOL-85) mailed Dec. 12, 2023; (pp. 1-8).
U.S. Appl. No. 18/101,771; Non-Final Rejection mailed Dec. 4, 2023; (pp. 1-16).
U.S. Appl. No. 18/101,791; Non-Final Rejection mailed Sep. 14, 2023; (pp. 1-31).
U.S. Appl. No. 18/101,791; Notice of Allowance and Fees Due (PTOL-85) mailed Dec. 29, 2023; (pp. 1-9).
U.S. Appl. No. 18/101,771; Non-Final Rejection mailed Nov. 29, 2024; (pp. 1-19).
U.S. Appl. No. 18/586,296; Non-Final Rejection mailed Sep. 17, 2024; (pp. 1-16).
U.S. Appl. No. 18/599,071; Non-Final Rejection mailed Sep. 19, 2024; (pp. 1-30).
U.S. Appl. No. 18/586,296; Notice of Allowance and Fees Due (PTOL-85) mailed Jan. 17, 2025; (pp. 1-8).
U.S. Appl. No. 18/599,071; Notice of Allowance and Fees Due (PTOL-85) mailed Jan. 29, 2025; (pp. 1-11).

* cited by examiner

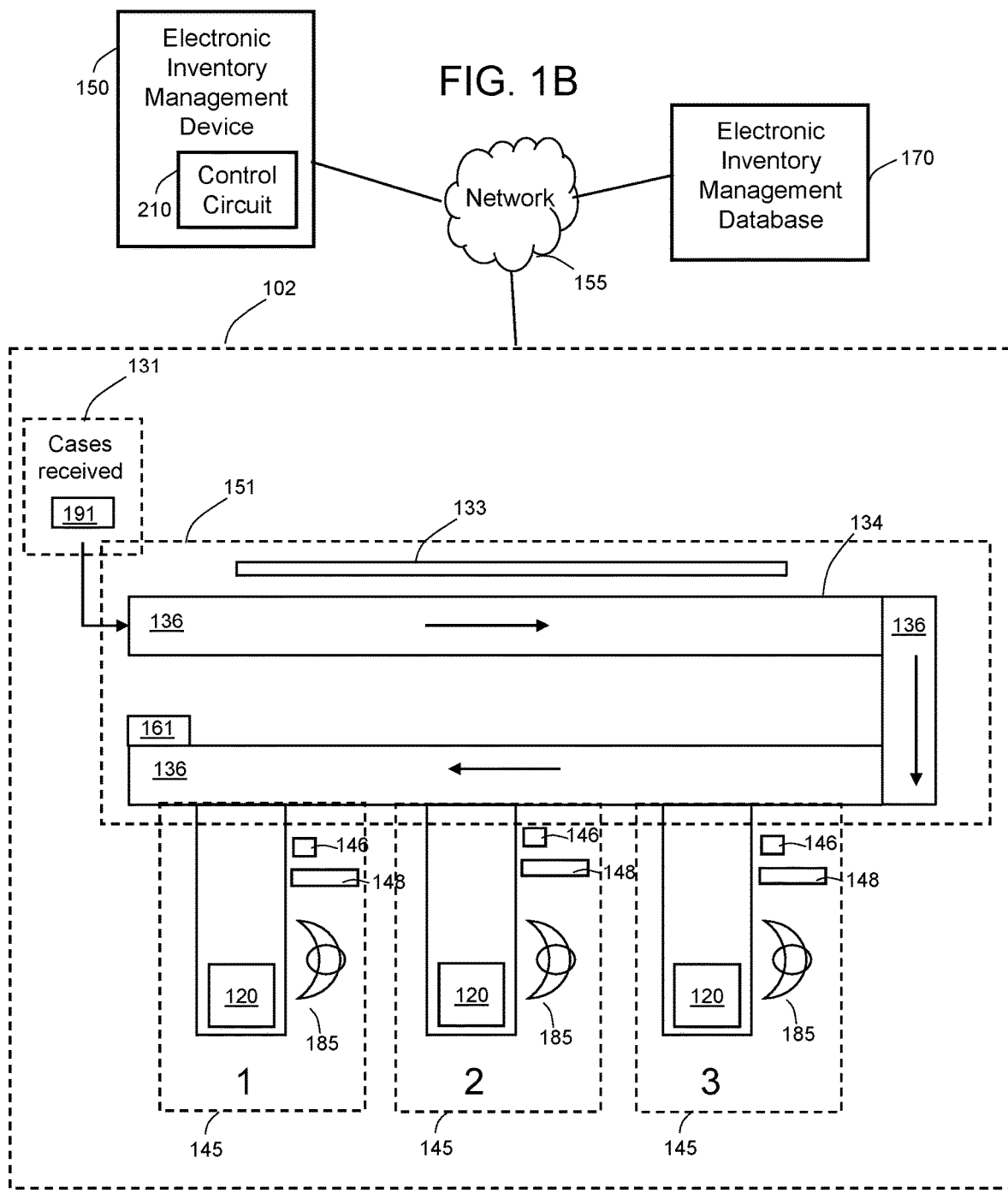

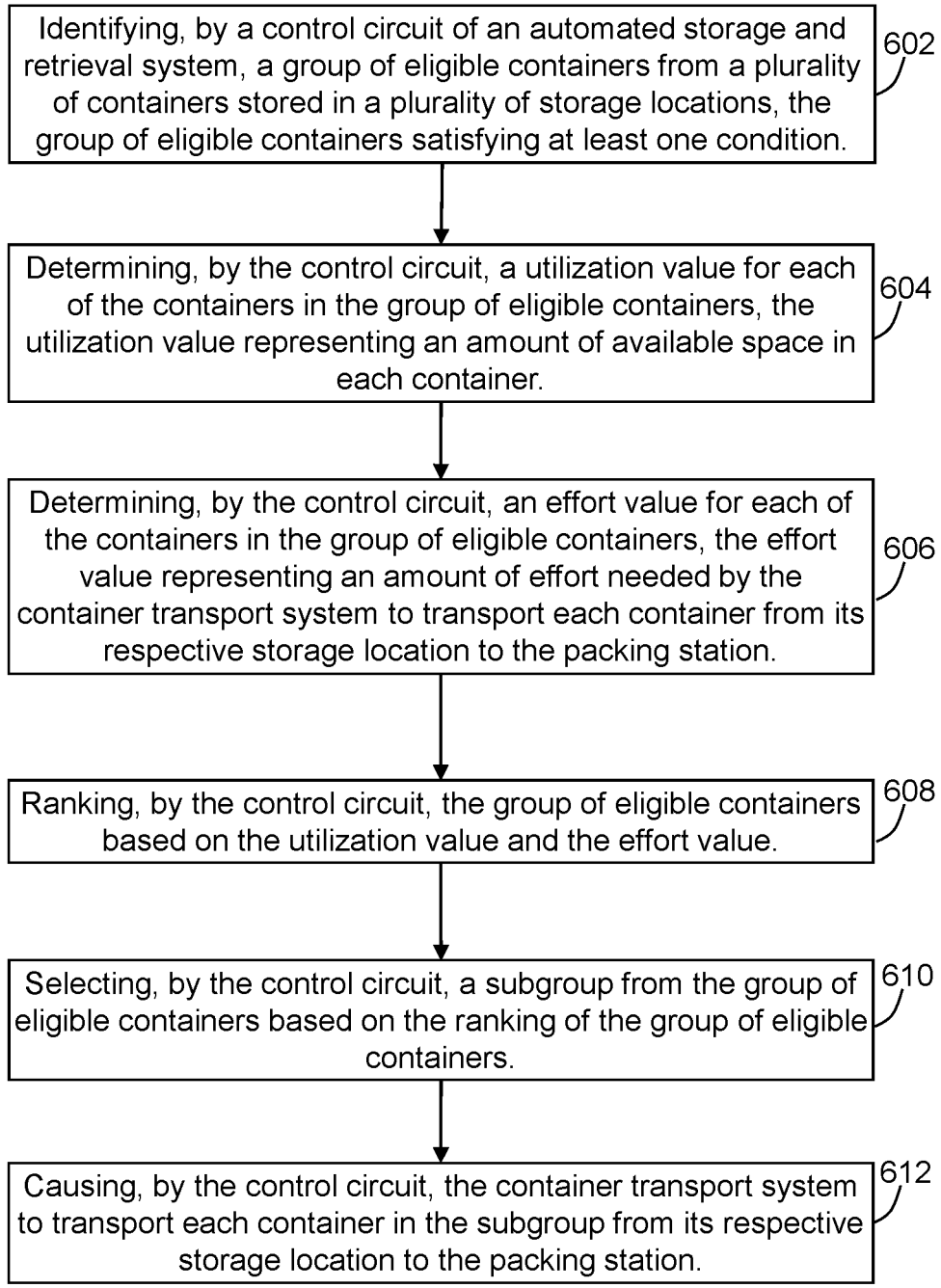

SYSTEMS AND METHODS FOR OPTIMIZING SPACE UTILIZATION OF CONTAINERS AT RETAIL STORAGE FACILITIES

CROSS-REFERENCE TO RELATED APPLICATION

This application claims the benefit of U.S. Provisional Application No. 63/304,950, filed Jan. 31, 2022, which is hereby incorporated by reference in its entirety.

TECHNICAL FIELD

This invention relates generally to managing product inventory and, in particular, to systems and methods for increasing space utilization of storage containers at retail or distribution facilities.

BACKGROUND

Automated storage and retrieval systems ("AS/RS") are often used by large retail entities to store products and manage inventory. AS/RS systems are generally configured to store and retrieve loads (e.g., products) from storage locations in a storage facility or fulfillment center. In a typical AS/RS system, when a load of products is received at a storage facility or fulfillment center, the system identifies the received products and conveys them to a particular location in the facility for storage. In some approaches, a group of products received in a shipment may be conveyed to a single storage location. In other approaches, a number of individual products from the shipment may be placed into a storage container (i.e., decanted), which is then conveyed to a particular storage location. Given the cost associated with storing large numbers of products in a storage facility, improving storage efficiency and container utilization can significantly increase capacity and/or decrease storage, operating, and fulfillment costs.

BRIEF DESCRIPTION OF THE DRAWINGS

Disclosed herein are embodiments of systems, apparatuses and methods pertaining to managing automated storage and retrieval and increasing space utilization of storage containers at retail or distribution facilities. This description includes drawings, wherein:

FIG. 1B is a diagram of an exemplary decanting system that may be used in an automated storage and retrieval system for managing storage of inventory at a retail facility, in accordance with some embodiments.

FIG. 6 is a flow diagram of an exemplary process for managing storage of inventory at a retail facility using an automated storage and retrieval system, in accordance with some embodiments.

Figure 1A:
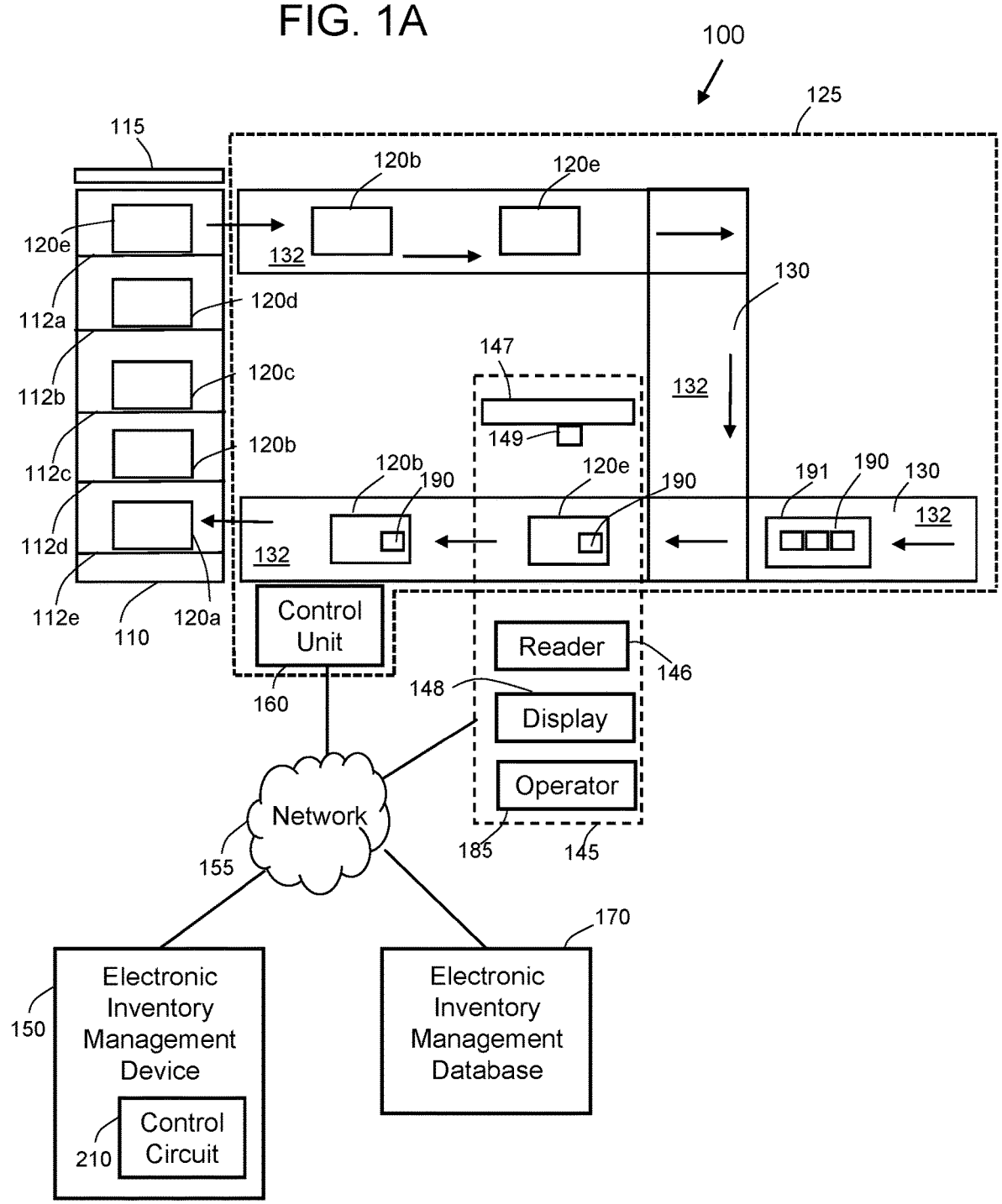
FIG. 1A is a diagram of an exemplary automated storage and retrieval system for managing storage of inventory at a retail facility, in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this disclosure relates to an automated storage and retrieval system for managing storage of inventory at a retail facility. The systems, apparatuses and methods described herein utilize one or more container-packing algorithms to determine the amount of space in each container stored in a storage structure associated with the system and then prioritizes those containers having the largest available (i.e., lowest utilized space) space for adding new products during decanting. A container handling cost function is also employed to determine which containers to top off with additional product when new shipments arrive at the facility needing to be decanted and stored. "Decanting" is the process by which cases of products are received from a supplier, vendor, etc. and individual products are removed from the cases and placed into available containers for storage.

The system includes a storage structure with storage locations configured to store containers that contain retail products, and a container transport system that transports the containers between the storage locations and one or more decanting stations. A processor based control circuit is configured to identify a group of eligible containers from a plurality of stored containers that satisfy at least one condition and determine a utilization value for each of the containers in the group of eligible containers, the utilization value representing an amount of occupied space in each container. The control circuit then determines an effort value for each of the containers in the group of eligible containers, the effort value representing an amount of effort needed by the automated storage and retrieval system to transport each container from its respective storage location to the decanting station. The control circuit ranks the group of eligible containers based on the utilization value and the effort value for each container, selects a subgroup from the group of eligible containers based on the ranking of the group of eligible containers, and causes the container transport system to transport each container in the subgroup from its respective storage location to the decanting station.

In some approaches, the effort value for each container may be based on at least one of a weight of the container, a distance between the storage location of the container and the decanting station, and an energy cost associated with transporting the container from the storage location to the decanting station. In some approaches, the utilization value for each container may be based on a volume utilized by all products in the container and a total volume of the container. In some approaches, the utilization value for each container may be based on a total area utilized by all products in the container and a total area of the container. The area utilized by all products in the container may be determined by obtaining an identity and a quantity of all products in the container and identifying an optimum configuration for the products in the container based on: (i) a length, a width, and a height of the at least one product; (ii) and the quantity of the at least one product. The optimum configuration may be a configuration having the greatest height of the products in the container, with a maximum height being a height of the container, and a lowest area by the products in the container. In some approaches, in the optimum configuration only same products are stacked on another. In some approaches, the at least one condition for the group of eligible containers comprises containers having a utilization value below a threshold value.

In some approaches, the system may further comprise an electronic reader configured to read machine readable codes and a database containing product information, container information, and associated storage locations. When one of the containers in the subgroup arrives at the decanting station, the control circuit may be configured to receive from the electronic reader a product identifier encoded by a first machine readable code disposed on an additional product needing to be packed and receive from the electronic reader a container identifier encoded by a second machine readable code disposed on the container. The control circuit may be further configured to associate the product identifier with the container identifier, associate the container identifier with a storage location in the storage structure, and cause the container transport system to transport the container containing the at least one product and the additional product to the associated storage location.

In some approaches, the system may further include a user display associated with the decanting station, and the control circuit is configured to cause the user display to display an instruction on how to optimally pack the additional product in the container.

FIG. 1A shows an embodiment of an automated storage and retrieval system 100 for managing storage of inventory at a retail facility. FIG. 1B shows an embodiment of an exemplary decanting system 102. The decanting system 102 described herein (and/or one or more components thereof) may be particularly useful in an automated storage and retrieval system in a retail storage facility, wherein the decanting system 102 (and/or one or more components thereof) may be operably coupled to an automated storage and retrieval system in a retail storage facility. The retail facility may be any entity operating as a brick-and-mortar physical location and/or a website accessible via the internet by way of which products 190 may be purchased by a consumer. A consumer may be an individual or a business entity. Exemplary products 190 that may be ordered by the consumers from the retailer via the system 100 may include, but are not limited to, general-purpose consumer goods, as well as consumable products, such as grocery products and/or other food items, medications, and dietary supplements.

The exemplary automated storage and retrieval system 100 shown in FIG. 1A includes a storage structure 110 including a plurality of storage locations 112a-112e configured to store a plurality of containers (also referred to as totes) 120a-120e, each containing one or more products 190. Notably, while the storage locations 112a-112e (e.g., storage shelves) have been shown in FIG. 1A as each storing one container 120a-120e thereon, it will be appreciated that each of the storage locations 112a-112e may store two or more storage containers 120 thereon.

In the exemplary system 100 of FIG. 1A, the storage structure 110 is operatively coupled to a container transport system 125 configured to transport the containers 120a-120e in the directions indicated by the arrows in FIG. 1A to/from the storage locations 112a-e of the storage structure 110 and to/from at least one decanting station 145 "Decanting" is the process by which cases 191 of products are received and individual products are removed 190 from the cases 191 and placed into available containers 120 for storage. In some approaches, the cases 191 may be unpacked, and the individual products 190 removed from the cases prior to the products arriving at the decanting station 145. While FIG. 1A shows only one decanting station 145, it is contemplated that the system 100 may include multiple decanting stations 145, as illustrated in FIG. 1B.

In some embodiments, the container transport system 125 comprises a conveying system including at least a main conveyor 130 configured to convey the containers 120a-120e in the directions indicated by the arrows in FIG. 1A to/from the storage locations 112a-e of the storage structure 110 and to/from at least one decanting station 145. The main conveyor 130 may also transport individual products 190, or cases thereof 191, from a loading station or zone (not shown in FIG. 1A, element 131 in FIG. 1B) to the decanting station 145. In some embodiments, the container transport system 125 can include non-conveyor-based mechanisms to transport the containers.

The exemplary automated storage and retrieval system 100 shown in FIG. 1A includes a generally U-shaped main conveyor 130, but it will be appreciated that the system 100 may include a differently-shaped main conveyor 130 and/or two or more main conveyors 130, depending on the size of the automated storage and retrieval system and/or the retail facility.

While the main conveyor 130 is illustrated in FIG. 1A as having two product storage containers (120b and 120e) thereon, it will be appreciated that the main conveyor 130, depending on its shape and size, may concurrently transport fewer storage containers 120 thereon, or significantly more storage containers 120 thereon. Further, while only the containers 120b and 120e are shown in FIG. 1A as having products 190 stored therein, it will be appreciated that each of the containers 120a-120e may contain any number (e.g., dozens and/or hundreds) of products 190 therein, depending on the size of the containers 120a-120e and the products 190. Further, the shape and size of the containers 120a-120e and the products 190 in FIG. 1A has been shown by way of example only, and it will be appreciated that the containers 120a-120e and the products 190 may have various shapes and sizes.

In the exemplary system 100 of FIG. 1A, the main conveyor 130 (also referred to herein as "the conveyor 130") has a product advancement surface 132 configured to move one or more products containers 120 or cases 191 in one or more directions indicated by the arrows. The product advancement surface 132 of the conveyor 130 may be comprised of a single conveyor belt surface or may be instead comprised of a series of two or more independently movable conveyor belt.

In some aspects, one or more of the independently movable conveyor surfaces of the product advancement surface 132 of the conveyor 130 may be configured to stop, while one or more of the other independently movable conveyor sections of the product advancement surface 132 are permitted to move. The conveyor 130 may be a belt conveyor, chain conveyor, or the like, and may have a continuous, uninterrupted product advancement surface 132, or may have a product advancement surface 132 that includes one or more interruptions at the transitions between the distinct, independently movable conveyor surfaces.

The system 100 depicted in FIG. 1A includes a control unit 160 operatively coupled to the conveyor 130 and configured to control movement of the conveyor 130 via one or more control signals. In some aspects, the control unit 160 is configured to start or stop the movement of the conveyor 130 (or one or more independently movable product advancement surfaces 132 of the conveyor 130) in response to one or more control signals sent from an electronic inventory management device 150 (also referred to herein as a computing device) of the system 100, which will be described in more detail below.

The electronic inventory management device 150 of the exemplary system 100 may be located at the retail facility or remotely relative to the retail facility, and may be a stationary or portable electronic device, for example, a desktop computer, a laptop computer, a tablet, a mobile phone, a computer cluster, a cloud-based SAAS system, or any other electronic device including a processor-based control circuit (i.e., control unit). In the embodiment of FIGS. 1A and 1B, the electronic inventory management device 150 is configured for data entry and processing as well as for communication with other devices of system 100 via the network 155. The exemplary network 155 depicted in FIGS. 1A and 1B may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like.

In some embodiments, the system 100 includes one or more localized Internet-of-Things (IoT) devices and controllers in communication with the electronic inventory management device 150. As a result, in some embodiments, the localized IoT devices and controllers can perform most, if not all, of the computational load and associated monitoring that would otherwise be performed by the electronic inventory management device 150, and then later asynchronous uploading of summary data can be performed by a designated one of the IoT devices to the electronic inventory management device 150, or a server remote to the electronic inventory management device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the electronic inventory management device 150 or a server remote to the electronic inventory management device 150.

In the embodiment of FIG. 1A, the system 100 includes one or more decanting stations 145 (only one is shown in FIG. 1A for simplicity) configured to permit a human operator 185 (e.g., a human worker assigned to work at the automated storage and retrieval system 100) to remove products 190 from newly received product cases 191 and place them in one or more containers 120.

In some embodiments, the decanting station 145 may include a movable robotic arm 147 that is positioned and configured to grasp one or more of the products 190 from the newly received cases 191 and place them in one or more of the containers 120 positioned at the decanting station 145 (e.g., container 120e). In certain implementations, the control unit 160 is configured to control the movement of the robotic arm 147 via one or more control signals. For example, the control unit 160 may control the start, stop, and direction of movement of the robotic arm 147 in response to one or more control signals sent from the electronic inventory management device 150. In some embodiment, the robotic arm 147 may not be controlled via the control unit 160, but may be operatively coupled to a separate control unit that is configured to control movement of the robotic arm 147 in response to one or more control signals sent from the electronic inventory management device 150.

In the system 100 of FIG. 1A, the storage structure 110 includes a movable robotic arm 115 that is positioned to have access to the storage locations 112a-112e and configured to grasp one or more of the containers 120a-120e positioned on the storage locations 112a-112e, and to transfer such containers 120a-120e from the storage structure 110 to the main conveyor 130. In certain implementations, the control unit 160 is configured to control the movement of the robotic arm 115 via one or more control signals. For example, the control unit 160 may control the start, stop, and direction of movement of the robotic arm 115 in response to one or more control signals sent from then electronic inventory management device 150. In some embodiment, the robotic arm 115 may not be controlled via the control unit 160, but may be operatively coupled to a separate control unit that is configured to control movement of the robotic arm 115 in response to one or more control signals sent from the electronic inventory management device 150.

In the exemplary system 100 depicted in FIG. 1A, the decanting station 145 includes one or more sensors 149 that are positioned and configured to detect the container at the decanting station, along with each of the products 190 picked from, placed into, and/or otherwise transferred between the containers by the operator 185 and/or by the robotic arm 147 at the decanting station 145. Suitable sensors may include, but are not limited to, one or more of a video camera, motion sensor, infrared sensor, bar code sensor, radio-frequency identification (RFID) sensor, laser sensor, or the like.

FIG. 1B illustrates an embodiment of an exemplary decanting system 102. It should be understood that the decanting system 102, or any component thereof, may be used in conjunction with, be associated with, or form any part of the automated storage and retrieval system 100 illustrated in FIG. 1A. Conversely, one or more components of the automated storage and retrieval system 100 illustrated in FIG. 1A may be used in conjunction with, be associated with, or form any part of the decanting system 102 illustrated in FIG. 1B. Additionally, while FIG. 1B depicts a configuration of an exemplary decanting system 102, one or more components of the system 102 may be arranged in any suitable configuration.

An exemplary decanting system 102 may include a loading zone 131 configured to receive product cases 191. Products are generally packaged in cases 191 and shipments of the cases 191 may be received regularly by the retail storage facility. The cases 191 may be transported to the facility, for example, via truck, trailer, or any other suitable transportation means and the cases may be unloaded to an area of the facility (e.g., a loading/unloading dock), which may include, or form part of, the loading zone 131.

The decanting system 102 further includes a plurality of decanting stations 145. Each decanting station 145 may be configured to allow an operator 185 to sit or stand in a manner conducive to packing containers 120 with products 190. The decanting stations 145 may include a display 148 (which may be a stand-alone display or a computing device with a display (e.g., a laptop, tablet, or the like)). The display 148 may provide useful information and/or illustrations about the product cases 191, the products 190 in the cases, and or information about the containers 120 at the decanting stations 145. In some embodiments, the display 148 may provide instructions and/or illustrations to the operator 185 regarding how to pack or otherwise configure the products 190 in the containers 120. In some embodiments, the control circuit 210 of an electronic inventory management device (e.g., electronic inventory management device) may send a signal to the display 148 to cause the display 148 to depict a visual representation to the operator 185 of an optimal packing configuration for packing containers.

In some approaches, each decanting station 145 may include an electronic reader 146 configured to read machine readable codes. The machine readable codes may encode, for example, product identifiers affixed to, or otherwise associated with, inventory products 190 and/or product cases 191, as well as container identifiers associated with the containers 120, and the like. The electronic reader 146 may include one or more optical sensors, image sensors, or other suitable sensors or readers configured to capture images or optically read machine-readable codes (e.g., bar codes, QR codes, etc.). In some approaches, the one or more of the sensors 133 may be a barcode reader or QR code reader configured to read a barcode or QR code affixed to an outside surface of a product case 191.

The decanting system 102 further includes a decanting transport system 151 configured to transport cases 191 from the loading zone 131 to one or more of the decanting stations 145. In some embodiments, the decanting transport system 151 comprises a conveying system including at least a main conveyor 134 configured to convey the cases 191. The exemplary decanting system 102 shown in FIG. 1B includes a generally U-shaped main conveyor 134, but it will be appreciated that the decanting system 102 may include a differently-shaped main conveyor 134 and/or two or more main conveyors 134, depending on the size of the retail storage facility. In some approaches, the main conveyor 134 may be a recirculating conveyor that intermittently collects new product cases 191 from the loading zone 131.

In the exemplary decanting system 102 of FIG. 1B, the main conveyor 134 (also referred to herein as "the conveyor 134") has a product advancement surface 136 configured to move one or more cases 191 in one or more directions indicated by the arrows. The product advancement surface 136 of the conveyor 134 may be comprised of a single conveyor belt surface or may be instead comprised of a series of two or more independently movable conveyor belt.

In some aspects, one or more of the independently movable conveyor surfaces of the product advancement surface 136 of the conveyor 134 may be configured to stop, while one or more of the other independently movable conveyor sections of the product advancement surface 136 are permitted to move. The conveyor 134 may be a belt conveyor, chain conveyor, or the like, and may have a continuous, uninterrupted product advancement surface 136, or may have a product advancement surface 136 that includes one or more interruptions at the transitions between the distinct, independently movable conveyor surfaces.

A control unit 161 may be operatively coupled to the conveyor 134 and configured to control movement of the conveyor 134 via one or more control signals. In some aspects, the control unit 161 is configured to start or stop the movement of the conveyor 134 (or one or more independently movable product advancement surfaces 136 of the conveyor 134) in response to one or more control signals sent from an electronic inventory management device (also referred to herein as a computing device) (e.g., electronic inventory management device 150).

In some approaches, the main conveyor 134 of the decanting transport system 151, (and/or the product advancement surface 136 of the conveyor 134), depicted in the decanting system 102 of FIG. 1B may be linked to and/or feed the main conveyor 130 (and/or the product advancement surface 132 of the conveyor 130) of the container transport system 125 of the automated storage and retrieval system 100 depicted in FIG. 1A.

The exemplary decanting system 102 depicted in FIG. 1B may further include one or more sensors 133 associated with the decanting transport system 151 and configured obtain information relating to the product cases 191 being transported by the decanting transport system 151. In some approaches, a portion of the product advancement surface 136 of the main conveyor 130 may be partially surrounded by a structure housing one or more of the sensors 133. For example, the one or more sensors may form part of a tunnel structure through which the product cases 191 are conveyed and the sensors 133 sense or otherwise obtain information about the product cases 191 as the product cases 191 are conveyed through the tunnel.

The sensors 133 may include any sensor suitable for obtaining information from, or about, the product cases 191 (and/or products therein), including, but not limited to, optical readers or sensors, image readers or sensors, weight sensors, infrared sensors, and the like. In some embodiments, the one or more sensors 133 associated with the decanting transport system 151 are sensors configured to capture images or optically read machine-readable codes such as bar codes, QR codes, etc. that may be present on the product cases 191. The machine readable codes may encode information relating to the product cases such as, for example, an identity of a product in the product case, a quantity of the product in the product case, one or more dimensions of the product in the product case, one or more dimensions of the product case, a weight of the product in the product case, and a weight of the product case. As each product case 191 is conveyed by conveyor 134 of the decanting transport system 151 from the loading zone 131 to one of the decanting stations 145, one or more sensors 133 obtain information from each product case 191 and transmit the information to the control circuit 210 and/or an electronic inventory management database (e.g., electronic inventory management database 170.)

Figure 2:
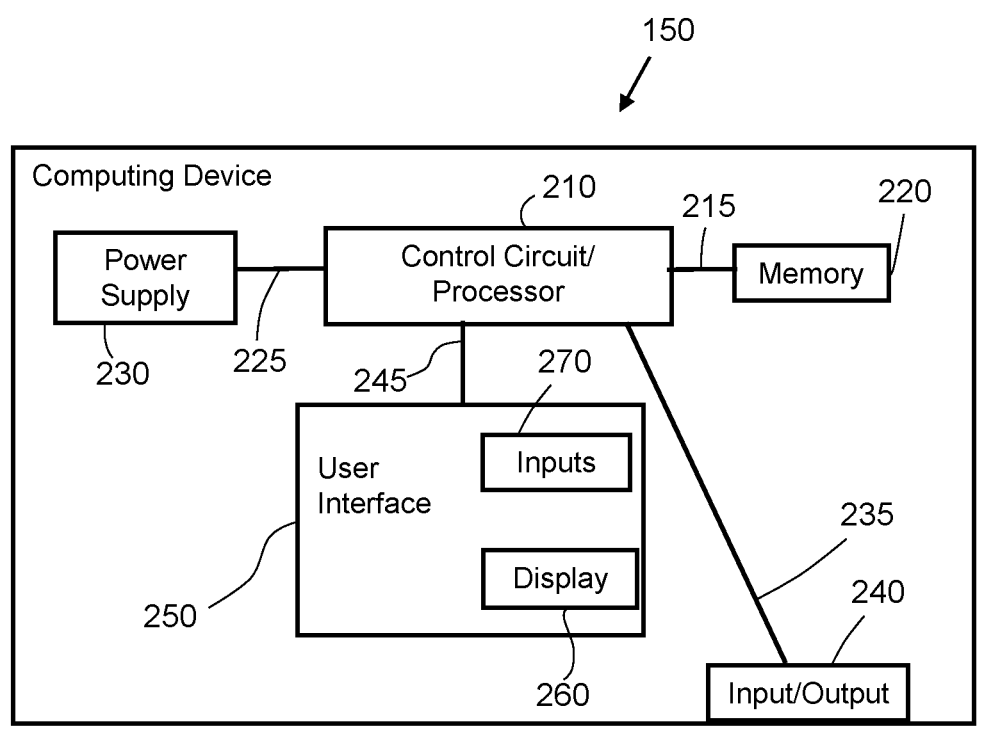
FIG. 2 is a functional diagram of an exemplary electronic inventory management device, in accordance with some embodiments.

With reference to FIG. 2, an exemplary electronic inventory management device 150 configured for use with exemplary systems and methods described herein may include a control circuit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit 210 may be referred to as a non-transitory medium or non-transitory computer readable medium.

The control circuit 210 of the electronic inventory management device 150 is also electrically coupled via a connection 235 to an input/output 240 that can receive signals from any of the other electronic components of the system 100 (e.g., control units, sensors, inventory management databases, displays, readers, transport systems, etc.), or from any other source (a regional central server, a hand-held device of a worker, etc.) that can communicate with the electronic inventory management device 150 via a wired or wireless connection. The input/output 240 can also send signals to the control units, sensors, inventory management databases, displays, readers, transport systems, etc. (shown in FIGS. 1A and 1B), or to any other device in wired or wireless communication with the electronic inventory management device 150.

In the embodiment shown in FIG. 2, the processor-based control circuit 210 of the electronic inventory management (or computing) device 150 is electrically coupled via a connection 245 to a user interface 250, which may include a visual display or display screen 260 (e.g., light-emitting diode (LED) screen) and/or button input 270 that provide the user interface 250 with the ability to permit an operator of the electronic inventory management device 150 to manually control the electronic inventory management device 150 by inputting commands via touch-screen and/or button operation and/or voice commands to, for example, set one or more rules relating to container topping-off, container merging, and/or product decanting with respect to the containers 120a-120k and/or products 190 processed by the automated storage and retrieval system 100. It will be appreciated that the performance of such functions by the processor-based control circuit 210 of the electronic inventory management device 150 is not necessarily dependent on a human operator (i.e., a facility associate), and that the control circuit 210 may be programmed to perform such functions without a human operator.

In conventional systems, when new products are received for storage in an automated storage and retrieval system, the products are added to totes or containers that are generally empty or nearly empty. This conventional method of decanting results in low tote utilization and increased storage costs. The systems and methods described herein employ certain business rules to optimize tote utilization by topping off totes that meet certain conditions with additional products and configuring the products in the totes in a manner that maximizes tote utilization.

In some embodiments, the control circuit 210 of the electronic inventory management device 150 is programmed to analyze at least one business rule governing the topping off of containers 120a-120e that are stored at the storage locations 112a-112e of the storage structure and 110 to identify from containers 120a-120e a group of containers that are eligible for topping off with one or more additional products 190. In certain aspects, the control circuit 210 determines which of the containers 120a-120e are eligible for topping off by identifying a group of containers that satisfy at least one condition. The at least one condition may be containers having a utilization value below a threshold value. In some approaches, the utilization threshold value may be, for example, 60% or more, in some approaches 50%, in some approaches 40%, in some approaches 30%, in some approaches 20%, and in some approaches 10%. The utilization value generally represents the amount of occupied space in each container 120. The utilization value for a given container 120 may be based on, for example, the volume of space utilized by all products 190 in the container compared to the total volume of the container 120. In another approach, the utilization value for a given container 120 may be based on, for example, the area utilized by the products 190 in the container compared to the total area of the container 120.

In some approaches, the area of a product 190 in a given container may be determined by the control circuit 210 by obtaining an identity of the product 190 in the container 120 and the number of same products 190 in the container 120 and identifying an optimum configuration of the product(s) 190 in the container based on: (i) a length, a width, and a height of the product; (ii) and the quantity of the product in the container. In some approaches, the optimum configuration of the product in the container may be a configuration having the greatest product height in the container, (with a maximum height being a height of the container) and a lowest area by the product in the container.

The control circuit 210 is further configured to determine an effort value for each of the containers in the group of eligible containers. The effort value represents an amount of effort needed by the container transport system 125 to transport each container from its respective storage location to the decanting station 145. Factors taken into account when determining the effort value may include, for example, the weight of the container, the distance between the storage location of the container and the decanting station, and an energy cost associated with transporting the container from the storage location to the decanting station. The control circuit 210 then ranks the group of eligible containers based on the utilization value and the effort value for each container and selects a subgroup from the group of eligible containers based on the ranking of the group of eligible containers. The control circuit then sends a signal to the control unit 160 to cause the container transport system 125 to transport each container in the subgroup from its respective storage location to the decanting station 145 (see containers 120b and 120e in FIG. 1A).

In the embodiment shown in FIGS. 1A and 1B, the electronic inventory management device 150 is coupled to and obtains the above-described business rules from an inventory management database 170 (also referred to herein simply as "the electronic database 170"). The electronic inventory management device 150 and the electronic inventory management database 170 may be implemented as a single device or may be implemented as two separate devices as illustrated in FIGS. 1A and 1B and may be located at the same location/facility or at different locations/facilities. The electronic database 170 may be stored, for example, on non-volatile storage media (e.g., a hard drive, flash drive, or removable optical disk) internal or external to the electronic inventory management device 150, or internal or external to computing devices separate and distinct from the electronic inventory management device 150. In some embodiments, the electronic inventory management database 170 may be cloud-based.

In some embodiments, the exemplary electronic inventory management database 170 of FIGS. 1A and 1B is configured to store electronic data associated with the products 190 stored in the containers 120a-120e stored and/or transported by the automated storage and retrieval system 100. In certain aspects, the electronic inventory management database 170 may store electronic data indicating one or more of: an identifier and physical location of each of the containers 120a-120e, identifiers of each of the products 190 stored in each of the containers 120a-120e; estimated container/tote utilization value (which may be expressed, for example, as a percentage representing the occupied and/or available storage space for products 190 inside of each of the containers 120a-120e at a given time; association between the products 190 located within the containers 120a-120e that are associated with product orders placed by one or more customers of the retailer (and an indication of the number of units of each product 190 associated with each of the product orders); names and addresses of the customers of the retailer who ordered the products 190 for delivery/pickup. In one aspect, the electronic data representing the available storage space within each of the containers 120a-120e may be in the form of a grid-like map or planogram. In some aspects, the electronic inventory management database 170 is configured to facilitate real-time tracking of the inventory of available storage space inside of the containers 120a-120e and for real-time tracking of the inventory of products 190 controlled by the automated storage and retrieval system 100.

In some embodiments, the display 260 of the electronic inventory management device 150 is configured to display various graphical interface-based menus, options, and/or alerts that may be transmitted from the electronic inventory management device 150 to, for example, the display 148, the control unit 160, or the like. The inputs 270 of the electronic inventory management device 150 may be configured to permit an operator to navigate through the on-screen menus on the electronic inventory management device 150 and make changes and/or updates to, for example, business rules relating to topping off containers with one or more additional products. It will be appreciated that the display screen 260 may be configured as both a display screen and an input 270 (e.g., a touch-screen that permits an operator to press on the display screen 260 to enter text and/or execute commands.)

Figure 3:
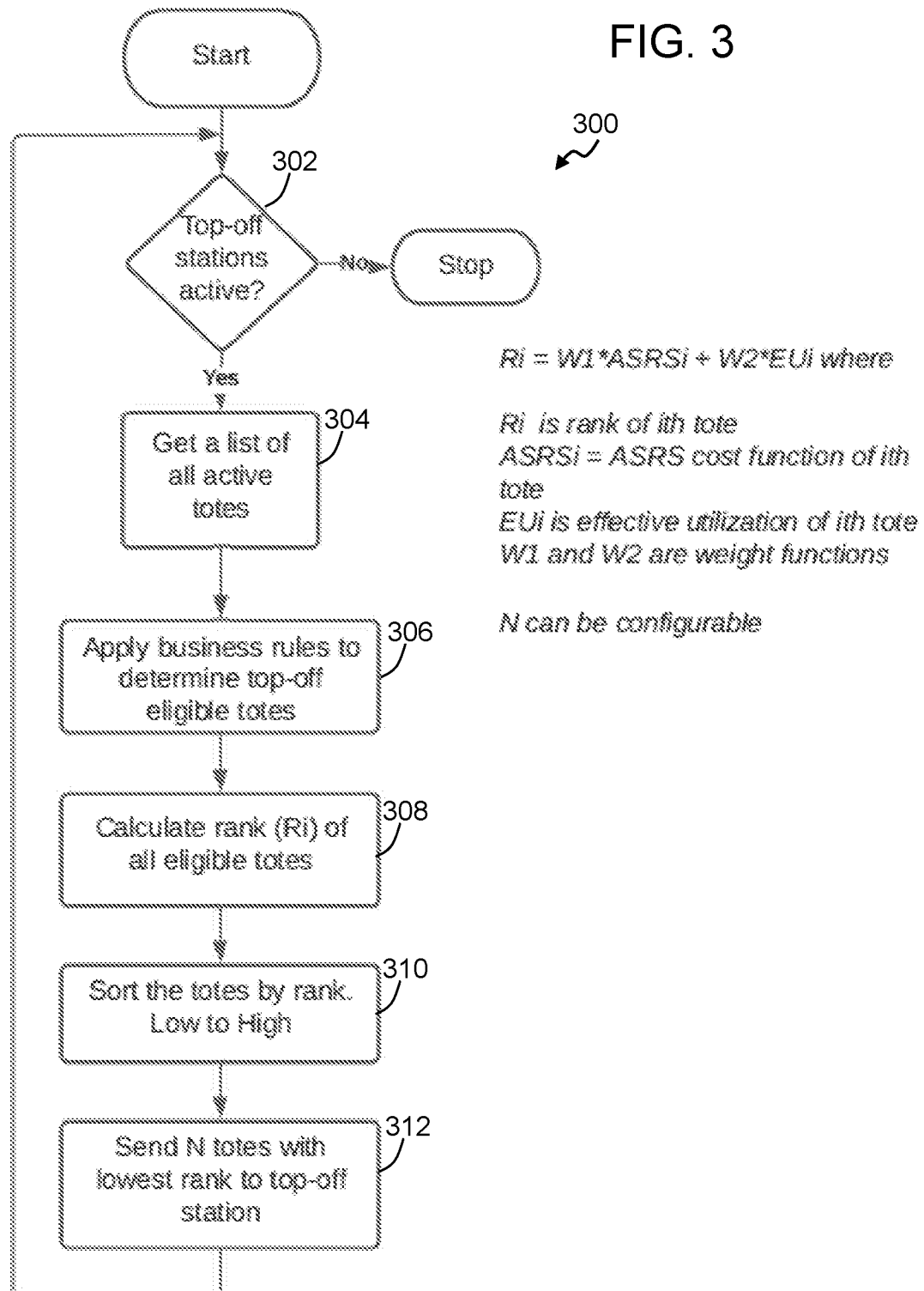
FIG. 3 is a flow diagram of an exemplary process for determining and ranking eligible storage containers for topping off, in accordance with some embodiments.

An exemplary container top-off analysis by the control circuit 210 of the electronic inventory management device 150 is represented by a flow chart-organized process 300 shown in FIG. 3. In some embodiments, some of the containers 120a-120e that are currently stored at storage locations 112a-112e of the storage structure 110 may be full and some may contain at least one product 190. To begin the process 300, the control circuit 210 first determines, based on an analysis of the current workload of the conveyor 130 and the current workload of the decanting stations 145 (step 302), whether one or more decanting stations 145 of the system 100 are available, active, or can otherwise accommodate decanting and/or a container top-off operation. If the control circuit 210 determines that a decanting station 145 is available for container top-off, the control circuit 210 is programmed to identify a list of active containers from the containers 120a-120e in the storage structure (step 304). Active containers may include, for example, containers that contain at least one product and/or do not have a current order associated with them. Additional factors may also be considered when determining which containers are active or otherwise available to topping off. The control circuit 210 then applies certain business rules to determine a group of those active containers are eligible to be topped off (step 306). Container eligibility may be determined based on, for example, the effective utilization of the container, described in more detail below with respect to FIG. 4. Generally speaking, effective utilization (EUi) may be based on the area and/or volume of the product(s) in the container compared to the total area/volume of the container. In some approaches, the control circuit 210 may base container eligibility on the effective available space of the container (EAi), which may be calculated by subtracting the effective utilization (EUi) from 100% (e.g., 45% EUi–100%=55% EAi). The business rules applied by the control circuit 210 to determine eligible containers may also include a cost function (ASRSi) applied to each container. The cost function considers, for example, the weight of each active container, a distance between the storage location of the container and the decanting station, and an energy cost associated with transporting the container from the storage location to the decanting station 145. For example, a container having a lighter weight and being located closer to the decanting station 145 may have a lower cost function (ASRSi) than a heavier container that may be further away from the decanting station 145.

In some approaches, when determining container eligibility, the control circuit 210 may consider attributes of products in the containers compared to products needing to be decanted, as well as any business rules pertaining to the products. For example, in some approaches, there may be one or more business rules limiting or restricting the types of products that may be stored together in a container (e.g., no chemical products with food products).

In step 308, the control circuit 210 calculates a rank for each eligible container (Ri) based on the container's effective utilization (EUi) and/or the container's effective available space (EAi) (e.g., based on area and/or volume) and its cost function (ASRSi) and sorts the containers based on ranking (e.g., low to high ranking). For example, a container having a low effective utilization (i.e., having low occupied space/high available space) and a low cost function would have a lower ranking than a container having a higher effective utilization and/or cost function. In some approaches, the effective utilization (EUi), effective available space (EAi) and/or the cost function (ASRSi) may have a weighting factor applied thereto (W1, W2), and each may be weighted similarly or differently based on various factors and/or additional business rules. In some approaches, the weighting factor may have a value between 0 and 1. In some approaches, the weighting factors may vary from storage facility to storage facility and in some approaches the weighting factors may vary dynamically with time.

Once the eligible containers are ranked, the control circuit 210 selects a number of containers (N) with the lowest rank. The control circuit 210 then transmits a signal to the control unit 160 to cause the container transport system 125 to transport the number of eligible containers from their respective storage locations to the decanting station 145, where the containers will be topped off with one or more additional products. The process described above with respect to FIG. 3 may be repeated for all containers in the storage structure 110 continuously, intermittently, at various intervals, and/or when requested by an operator 185 depending on, for example, need, capacity, decanting station availability, etc.

Figure 4:
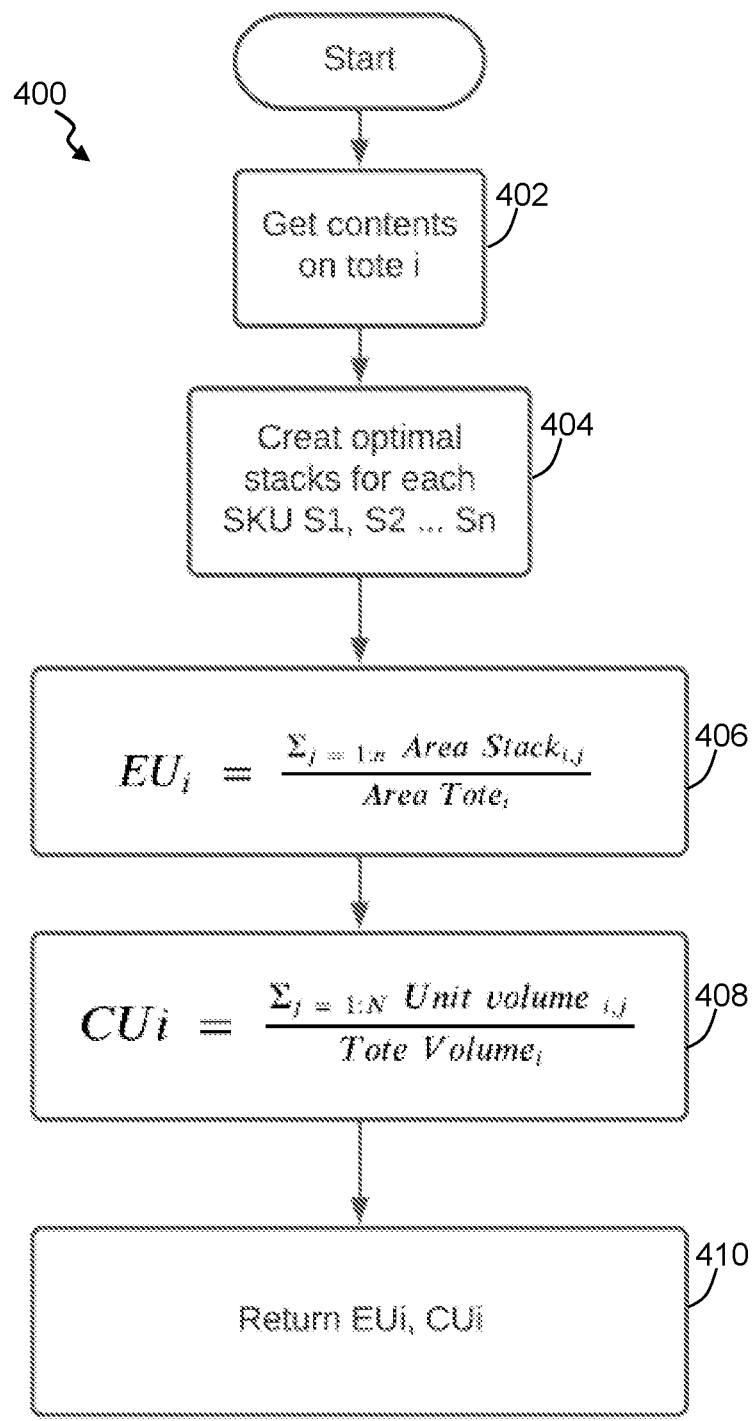
FIG. 4 is a flow diagram of an exemplary process for determining utilization values for storage containers, in accordance with some embodiments.

An exemplary utilization algorithm utilized by the control circuit 210 in an exemplary embodiment is depicted by way of a flow process 400 in FIG. 4. In the flow process 400, the control circuit 210 in step 402 determines the contents of each active container 120. The contents of each container may be stored in the electronic inventory management database 170. For example, each time a product 190 is added to a container 120 during decanting, merging, etc., machine readable codes associated with the product 190 and container 120 may be read by an electronic reader 146 associated with the decanting station 145. The inventory management database 170 receives the data encoded by the machine readable codes and electronically links each product 190 to its respective container 120. In determining the contents of each active container, the control circuit 210 identifies the SKU of each product and the number of each product in each container.

Figure 5:
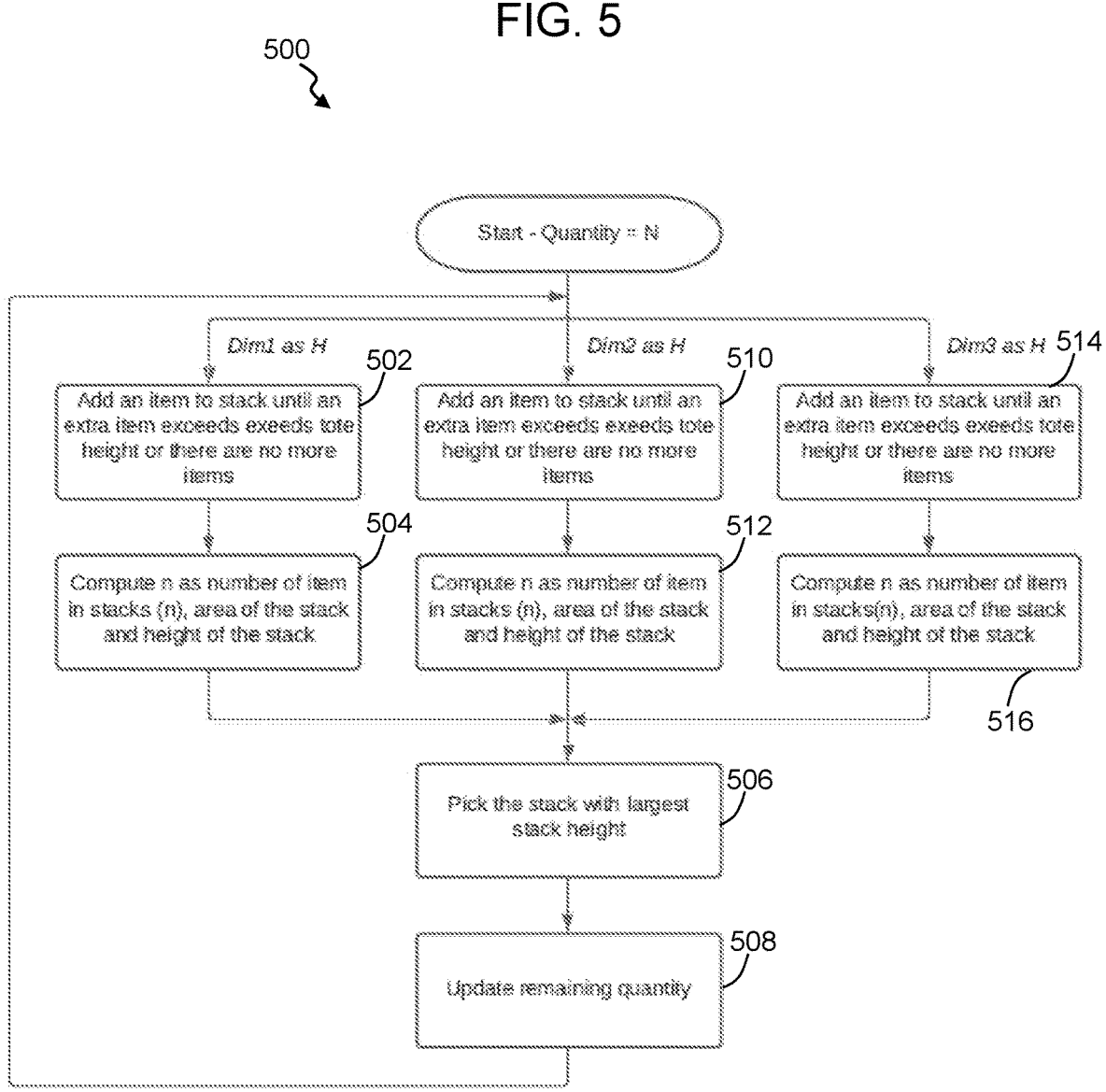
FIG. 5 is a flow diagram of an exemplary process for determining optimal stacking configurations of products in storage containers, in accordance with some embodiments.

In step 404, the control circuit 210 electronically creates optimal product stacks for the products/SKUs in each container 120. A detailed description of an exemplary stacking algorithm is described below with respect to FIG. 5. Generally speaking, the control circuit 210 applies business rules to electronically stack the products in each container in the most effective manner to maximize container utilization. One type of utilization is "effective utilization" (EUi), which may be calculated by determining the area of all products optimally stacked in the container divided by the total area of the container (step 406). In one illustrative non-limiting example, if a container 120 contains two smartphones stacked upon one another and three tablets stacked upon on another, the effective utilization may be calculated by adding the areas of both the stacks in the container 120 and dividing the combined area by the total area of the container 120. The area of each product 190 and each container 120, as well as optimal tacking configurations, may be stored in the electronic inventory management database 170, and the control circuit 210 may query the database to obtain this data as needed.

Another type of container utilization is "cube utilization" (CUi), which may be calculated by determining the volume of all products 190 in the container 120 divided by the volume of the container (step 408). In one illustrative non-limiting example, if the volume of two smartphones and three tablets stored in a particular container 120 is 1 cubic foot and the total volume of the container is 2 cubic feet, the cube utilization for that container would be 50%. The volume of each product 190 and each container 120 may be stored in the electronic inventory management database 170 and the control circuit 210 may query the database to obtain this data as needed.

In step 410, the control circuit returns effective utilization and/or cube utilization values (and/or, in some approaches, effective available space values) for each active container and inputs these values into the algorithm described above with reference to FIG. 3 for determining and ranking eligible containers.

Effective utilization may be maximized by stacking products 190 in a container 120 in the most optimal manner possible, while maintaining the confines of particular business rules. Exemplary business rules may include, for example, only stacking like SKUs/products upon on another, particular stacked height restrictions, container weight restrictions, product combination restrictions, and the like. An exemplary stacking algorithm utilized by the control circuit 210 for optimally stacking products in containers is depicted by way of a flow process 500 in FIG. 5. One or more outputs of process 500 may be used as utilization inputs for process 400 described above with reference to FIG. 4.

The inputs for process 500 include dimensions of each product/SKU in a given container, as well as the quantity of each SKU in the container, which the control circuit 210 may obtain by querying the inventory management database 170. Generally speaking, there are a number of possible ways to stack a product 190 in a container 120 based on the product's height, width, and length. The algorithm described herein for process 500 electronically stacks like products/SKUs in each container 120 based on each dimension of the product (height, length, width) to finds the most optimal stacking orientation of the product 190 in the container 120 within the confines of the applied business rules. In some approaches, the optimal stacking orientation for a product 190 or group of like products in a container 120 has the smallest stacking area. In other approaches, the optimal stacking orientation for a group of products to achieve the smallest stacking area may include stacking different products upon another in a container 120 (e.g., which may be subject to limitations based on product weight, fragility, etc., as well as product combination restrictions). The areas of each optimized stack in a container are then combined to determine the effective utilization for each container.

For example, in the process 500, where the first dimension is height (H) in step 502, the second dimension is height (H) in step 510, and the third dimension is height (H) in step 514, for each SKU/product in the container, the control circuit 210 electronically stacks the products/SKUs in the container until an extra item exceeds the container height or there are no more products to add. In steps 504, 512, and 516, the control circuit 210 computes "n" as the number of products in each stack, the area of each stack, and the height of each stack. In other words, the control circuit 210 continues to stack like items in each dimension until there are no more like products to stack and/or a height restriction is reached. Having created three separate product stacks based on each dimension of the product, in step 506 the control circuit 210 selects the stack having the largest stack height and/or, in some approaches, the smallest utilized area. In step 508, the control circuit updates the remaining quantity of products to be stacked and the process may be repeated as needed, based on the number of products still needing to be stacked. The area of each optimized stack for each product in a given container may then be used to determine the effective utilization (and/or available space) of the container in the process 400 of FIG. 4 for determining and ranking containers eligible for topping off with new products.

With reference back to the exemplary system 100 depicted in FIGS. 1A and 1B, in some approaches, the decanting station 145 may include an electronic reader 146 configured to read machine readable codes. The machine readable codes may encode, for example, product identifiers affixed to, or otherwise associated with, inventory products 190, as well as container identifiers associated with the containers 120, and the like. The electronic reader 146 may include one or more optical sensors, image sensors, or other suitable sensors or readers configured to capture images or optically read machine-readable codes (e.g., bar codes, QR codes, etc.). When a partially-filled container arrives at the decanting station 145 via the main conveyor 130 for topping off with one or more additional products (see container 120e), the electronic reader 146 reads the product identifier encoded by the machine readable code disposed on the new product 190 to be packed in the container 120e, and the electronic reader 146 reads the container identifier associated with the container 120e to be topped off. In some approaches, the electronic reader 146 may automatically read the product and container identifiers when they are adjacent to the reader 146. In other approaches, the electronic reader 146 may be operated by the operator 185 to read the product and container identifiers. Product and container identifiers are transmitted by the electronic reader 146 and received by the control circuit 210, which associates the product identifier with the container identifier and associates the container identifier with a storage location 112e in the storage structure 110. These associations may then be stored in the electronic inventory management database 170, where they may be subsequently queried by the control circuit 210 as needed. Once the product 190 has been packed in its associated container 120e, the control circuit 210 may cause the container transport system to transport the topped off container 120e to the container's associate storage location 112e in the storage structure 110.

In the exemplary embodiment shown in FIGS. 1A and 1B, the decanting station 145 may also include a display 148 (which may be a stand-alone display or a computing device with a display (e.g., a laptop, tablet, or the like)). In some embodiments, the control circuit 210 of the electronic inventory management device 150 may send a signal to the display 148 to cause the display 148 to depict a visual representation to the operator 185 of an optimal packing configuration for topping off the eligible container 120e arriving at the decanting station 145.

FIG. 6 shows an embodiment of a method 600 of using an automated storage and retrieval system 100 for managing storage of inventory at a retail facility. With reference to FIGS. 1 and 6, the exemplary method 600 includes, in step 602, identifying, by a control circuit 210 of an automated storage and retrieval system 100, a group of eligible containers from a plurality of containers 120a-120e stored in a plurality of storage locations 112a-112e, the group of eligible containers (102b and 102e) satisfying at least one condition. For example, the at least one condition may be containers having a utilization value below a particular utilization threshold value (and/or an available space above a particular threshold). The utilization value of a container 120 generally represents and amount of occupied space in the container. The utilization value for a given container 120 may be based on, for example, the volume of space utilized by all products 190 in the container compared to the total volume of the container 120. In another approach, an effective utilization value for a given container 120 may be based on, for example, the area utilized by optimally stacked products 190 in the container 120 compared to the total area of the container 120. The effective available space in a container may be determined by subtracting the effective utilization (e.g., based on area and/or volume) from 100%.

In some approaches, the area of a product 190 in a given container 120 may be determined by the control circuit 210 by obtaining an identity of the product in the container and the number of same products in the container and identifying an optimum configuration of the product(s) in the container based on: (i) a length, a width, and a height of the product; (ii) and the quantity of the product in the container. In some approaches, the optimum configuration of the product 190 in the container 120 may be a configuration having the greatest product height in the container, (with a maximum height being a height of the container) and/or a lowest area by the product in the container.

As mentioned above, the storage locations 112a-112e of the storage structure 110 can store one or more of the containers 120a-120e thereon. The containers 120a-120e may be transferred from the storage locations 112a-112e to the container transport system 125 and from the container transport system 125 onto the storage locations 112a-112e by a human operator 185 or by a robotic arm 115, as depicted in FIG. 1A. As described above, the container transport system 125 of the exemplary automated storage and retrieval system 100 may include a main conveyor 130 configured to convey the top-off eligible containers between the storage locations 112a-112e of the storage structure 110 and the decanting station 145, where the products 190 are added to top-off eligible containers As described above, in some embodiments, a control unit 160 is operatively coupled to the main conveyor 130 of the container transport system 125, and this control unit 160 is configured to control the movement of the main conveyor 130 for example, in response to receiving control signals from the control circuit 210 of the electronic inventory management device 150.

Turning back to FIG. 6, in step 606 of method 600 the control circuit 210 determines an effort value for each of the containers in the group of eligible containers. The effort value represents an amount of effort needed by the container transport system 125 to transport each container from its respective storage location to the decanting station 145. Factors taken into account when determining the effort value may include, for example, the weight of the container, the distance between the storage location of the container and the decanting station, and an energy cost associated with transporting the container from the storage location to the decanting station.

In step 608, the control circuit 210 ranks the group of eligible containers based on the utilization value (and or the effective available space) and the effort value for each container and, in step 610 the control circuit 210 selects a subgroup from the group of eligible containers based on the ranking of the group of eligible containers.

In step 612, the control circuit 210 sends a signal to the control unit 160 to cause the container transport system 125 to transport the eligible containers (120b and 102e) in the subgroup from their respective storage locations to the decanting station 145.

In some approaches, when one of the eligible containers (102e) in the subgroup arrives at the decanting station 145, the control circuit 210 may be configured to receive from the electronic reader 146 a product identifier encoded by a machine readable code disposed on a product 190 needing to be packed. The control circuit 210 may also receive from the electronic reader a container identifier encoded by a machine readable code disposed on the container 120e to be topped off. The control circuit 210 then associates the product identifier with the container identifier and associates the container identifier with a storage location 112e in the storage structure 110. When the product 190 to be packed has been packed in the container 120e to be topped off, the control circuit 210 may cause the container transport system 125 to transport the container 120e to its associated storage location 112e.

The systems and methods described herein advantageously allow retail facilities to automatically optimize storage space utilization of storage containers in automated storage and retrieval systems. The systems and methods describe herein thus provide significant operation efficiency and operation cost reduction for the retailers.

In some embodiments, an automated storage and retrieval system for managing storage of inventory at a retail facility comprises: a storage structure having a plurality of storage locations configured to store a plurality of containers, each of the plurality of containers containing least one product; a container transport system configured to transport the containers between the storage locations and a decanting station, where one or more products are added to or removed from one or more of the containers; a control unit operatively coupled to the container transport system and configured to control movement of the container transport system; and a control circuit communicatively coupled to the control unit, the control circuit being configured to: identify a group of eligible containers from the plurality of containers, the group of eligible containers satisfying at least one condition; determine a utilization value for each of the containers in the group of eligible containers, the utilization value representing an amount of occupied space in each container; determine an effort value for each of the containers in the group of eligible containers, the effort value representing an amount of effort needed by the container transport system to transport each container from its respective storage location to the decanting station; rank the group of eligible containers based on the utilization value and the effort value for each container; select a subgroup from the group of eligible containers based on the ranking of the group of eligible containers; and cause the container transport system to transport each container in the subgroup from its respective storage location to the decanting station.

In some embodiments, a method of using an automated storage and retrieval system for managing storage of inventory at a retail facility comprises: identifying, by a control circuit of the automated storage and retrieval system, a group of eligible containers from a plurality of containers stored in a plurality of storage locations, the group of eligible containers satisfying at least one condition, wherein the automated storage and retrieval system comprises a storage structure having the plurality of storage locations, a container transport system, a decanting station, and the control circuit, wherein each of the plurality of containers contains least one product; determining, by the control circuit, a utilization value for each of the containers in the group of eligible containers, the utilization value representing an amount of occupied space in each container; determining, by the control circuit, an effort value for each of the containers in the group of eligible containers, the effort value representing an amount of effort needed by the container transport system to transport each container from its respective storage location to the decanting station; ranking, by the control circuit, the group of eligible containers based on the utilization value and the effort value; selecting, by the control circuit, a subgroup from the group of eligible containers based on the ranking of the group of eligible containers; and causing, by the control circuit, the container transport system to transport each container in the subgroup from its respective storage location to the decanting station.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An automated storage and retrieval system for managing storage of inventory at a retail facility, the system comprising:
   a storage structure having a plurality of storage locations configured to store a plurality of containers, each of the plurality of containers containing at least one product already present in the container;
   a container transport system configured to transport the containers between the storage locations and a decanting station, where one or more products are added to or removed from one or more of the containers;
   a control unit operatively coupled to the container transport system and configured to control movement of the container transport system;
   a database containing at least product information and container information; and
   a control circuit communicatively coupled to the control unit and the database, the control circuit being configured to:
      identify from the plurality of containers a group of eligible containers not associated with a current customer order, the group of eligible containers satisfying at least one condition;
      identify, from the group of eligible containers, containers having the largest available space for accommodating one or more additional products by determining a utilization value for each of the containers in the group of eligible containers based on an area utilized by the at least one product already present in the container and a total area of the container, wherein the control circuit determines the area utilized by the at least one product already present in each container by:
         receiving from the database an identity and a quantity of the at least one product already present in the container;
         electronically creating stacking configurations of the at least one product already present in the container: (i) based on the product's length; (ii) based on the product's width; and (iii) based on the product's height; and
         selecting an optimum configuration from the electronically created stacking configurations, wherein the optimum configuration is a configuration having a greatest height of the at least one product already present in the container, with a maximum height being a height of the container, and a lowest area by the at least one product already present in the container;
         wherein the area utilized by the at least one product already present in the container is the lowest area by the at least one product already present in the container in the optimum configuration;
      determine an effort value for each of the containers in the group of eligible containers, the effort value representing an amount of effort needed by the container transport system to transport each container from its respective storage location to the decanting station;
rank the group of eligible containers based on the utilization value and the effort value for each container;
select a subgroup from the group of eligible containers based on the ranking of the group of eligible containers; and
cause the container transport system to transport each container in the subgroup from its respective storage location to the decanting station, wherein the at least one condition for the group of eligible containers comprises having a utilization value below a threshold value.

2. The system of claim 1, wherein the control circuit is configured to determine the effort value for each container based on at least one of a weight of the container, a distance between the storage location of the container and the decanting station, and an energy cost associated with transporting the container from the storage location to the decanting station.

3. The system of claim 1, wherein in the optimum configuration only same products are stacked upon one another.

4. The system of claim 3, wherein, when the control circuit electronically creates stacking configurations of at least one product already present in the container, when the maximum height is reached in the container, the control circuit electronically creates another stack of the same product in the container.

5. The system of claim 1, further comprising:
an electronic reader configured to read machine readable codes; and
a database containing product information, container information, and associated storage locations;
wherein, when one of the containers in the subgroup arrives at the decanting station, the control circuit is configured to:
receive, from the electronic reader, a product identifier encoded by a first machine readable code disposed on an additional product needing to be packed;
receive, from the electronic reader, a container identifier encoded by a second machine readable code disposed on the container;
associate the product identifier with the container identifier;
associate the container identifier with a storage location in the storage structure; and
cause the container transport system to transport the container containing the at least one product and the additional product to the associated storage location.

6. The system of claim 5, further comprising a user display associated with the decanting station, wherein the control circuit is configured to cause the user display to display an instruction on how to pack the additional product in the container.

7. The system of claim 1, wherein, prior to identifying the group of eligible containers from the plurality of containers, the control circuit is configured to receive an indication that the decanting station is active.

8. The system of claim 1, wherein the at least one product already present in the container comprises a first group of products of one type and a second group of products of another type, and the control circuit electronically creates separate stacking configurations for the first group of products and the second group of products in the container.

9. A method of using an automated storage and retrieval system for managing storage of inventory at a retail facility, the method comprising:
identifying from a plurality of containers, by a control circuit of the automated storage and retrieval system, a group of eligible containers not associated with a current customer order stored in a plurality of storage locations, the group of eligible containers satisfying at least one condition, wherein the automated storage and retrieval system comprises a storage structure having the plurality of storage locations, a container transport system, a database containing at least product information and container information, a decanting station, and the control circuit, wherein each of the plurality of containers contains at least one product already present in the container;
identifying, by the control circuit, from the group of eligible containers, containers having the largest available space for accommodating one or more additional products by determining a utilization value for each of the containers in the group of eligible containers based on an area utilized by the at least one product already present in the container and a total area of the container, wherein the control circuit determines the area utilized by the at least one product already present in each container by:
receiving from the database an identity and a quantity of the at least one product already present in the container;
electronically creating stacking configurations of the at least one product already present in the container: (i) based on the product's length; (ii) based on the product's width; and (iii) based on the product's height; and
selecting an optimum configuration from the electronically created stacking configurations, wherein the optimum configuration is a configuration having a greatest height of the at least one product already present in the container, with a maximum height being a height of the container, and a lowest area by the at least one product already present in the container;
wherein the area utilized by the at least one product already present in the container is the lowest area by the at least one product already present in the container in the optimum configuration;
determining, by the control circuit, an effort value for each of the containers in the group of eligible containers, the effort value representing an amount of effort needed by the container transport system to transport each container from its respective storage location to the decanting station;
ranking, by the control circuit, the group of eligible containers based on the utilization value and the effort value;
selecting, by the control circuit, a subgroup from the group of eligible containers based on the ranking of the group of eligible containers; and
causing, by the control circuit, the container transport system to transport each container in the subgroup from its respective storage location to the decanting station, wherein the at least one condition for the group of eligible containers comprises containers having a utilization value below a threshold value.

10. The method of claim 9, wherein the effort value for each container is determined by the control circuit based on at least one of a weight of the container, a distance between the storage location of the container and the decanting station, and an energy cost associated with transporting the container from the storage location to the decanting station.

11. The method of claim 9, wherein in the optimum configuration only same products are stacked upon one another.

12. The method of claim 11, wherein, when the control circuit electronically creates stacking configurations of at least one product already present in the container, when the maximum height is reached in the container, the control circuit electronically creates another stack of the same product in the container.

13. The method of claim 9, further comprising:
wherein, when one of the containers in the subgroup arrives at the decanting station, the control circuit is configured to:
receive, from an electronic reader configured to read machine readable codes, a product identifier encoded by a first machine readable code disposed on an additional product needing to be packed;
receive, from the electronic reader, a container identifier encoded by a second machine readable code disposed on the container;
associate the product identifier with the container identifier;
associate the container identifier with a storage location in the storage structure; and
causing the container transport system to transport the container containing the at least one product and the additional product to the associated storage location.

14. The method of claim 13, wherein the control circuit causes a user display associated with the decanting station to display an instruction on how to pack the additional product in the container.

15. The method of claim 9, wherein, prior to identifying the group of eligible containers from the plurality of containers, the control circuit receives an indication that the decanting station is active.

16. The method of claim 9, wherein the at least one product already present in the container comprises a first group of products of one type and a second group of products of another type, and the control circuit electronically creates separate stacking configurations for the first group of products and the second group of products in the container.

* * * * *